March 24, 1942.    W. L. GROENE    2,277,432
SPEED CHANGING MECHANISM
Filed Dec. 23, 1940    3 Sheets-Sheet 3
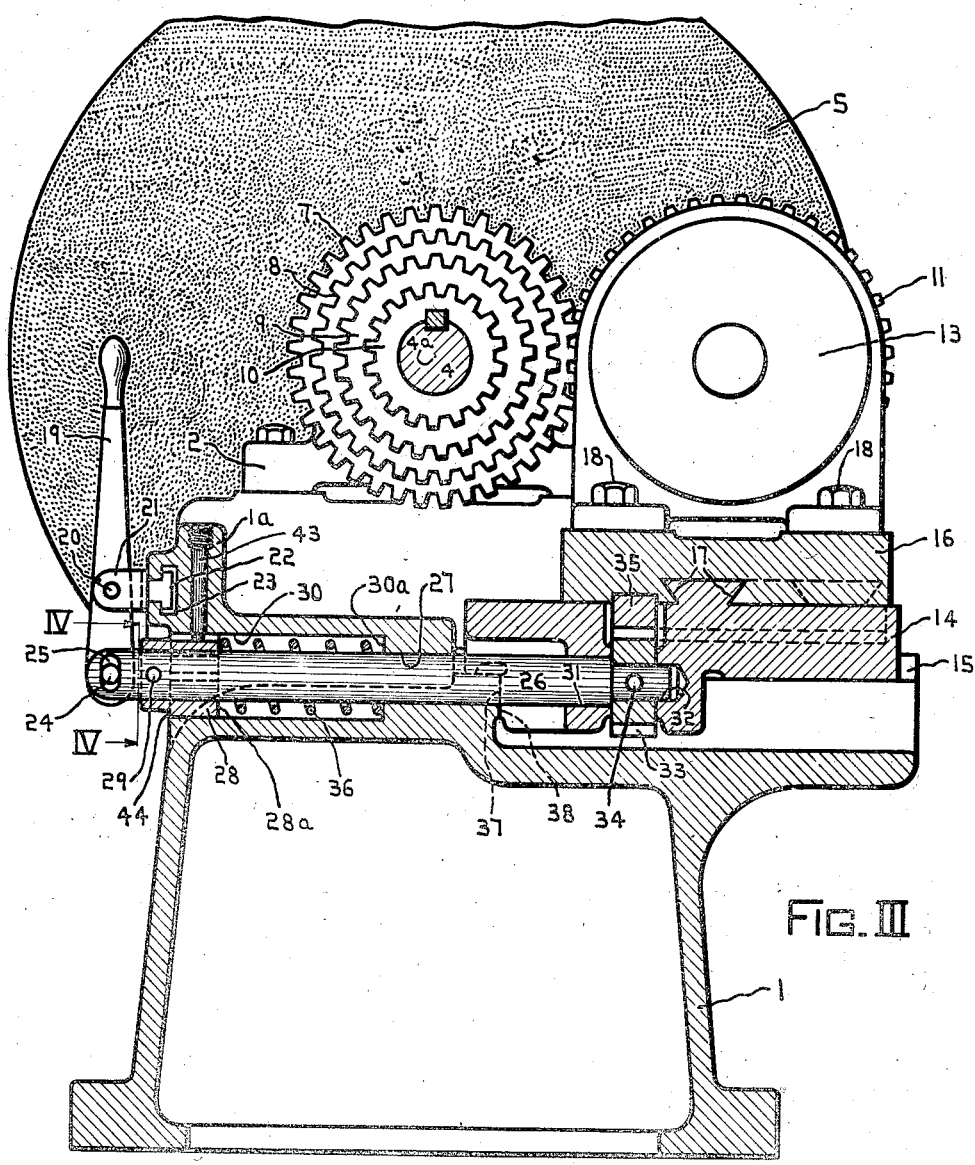
Fig. III
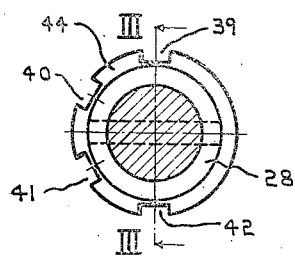
Fig. IV
INVENTOR.
Willard L. Groene Patented Mar. 24, 1942

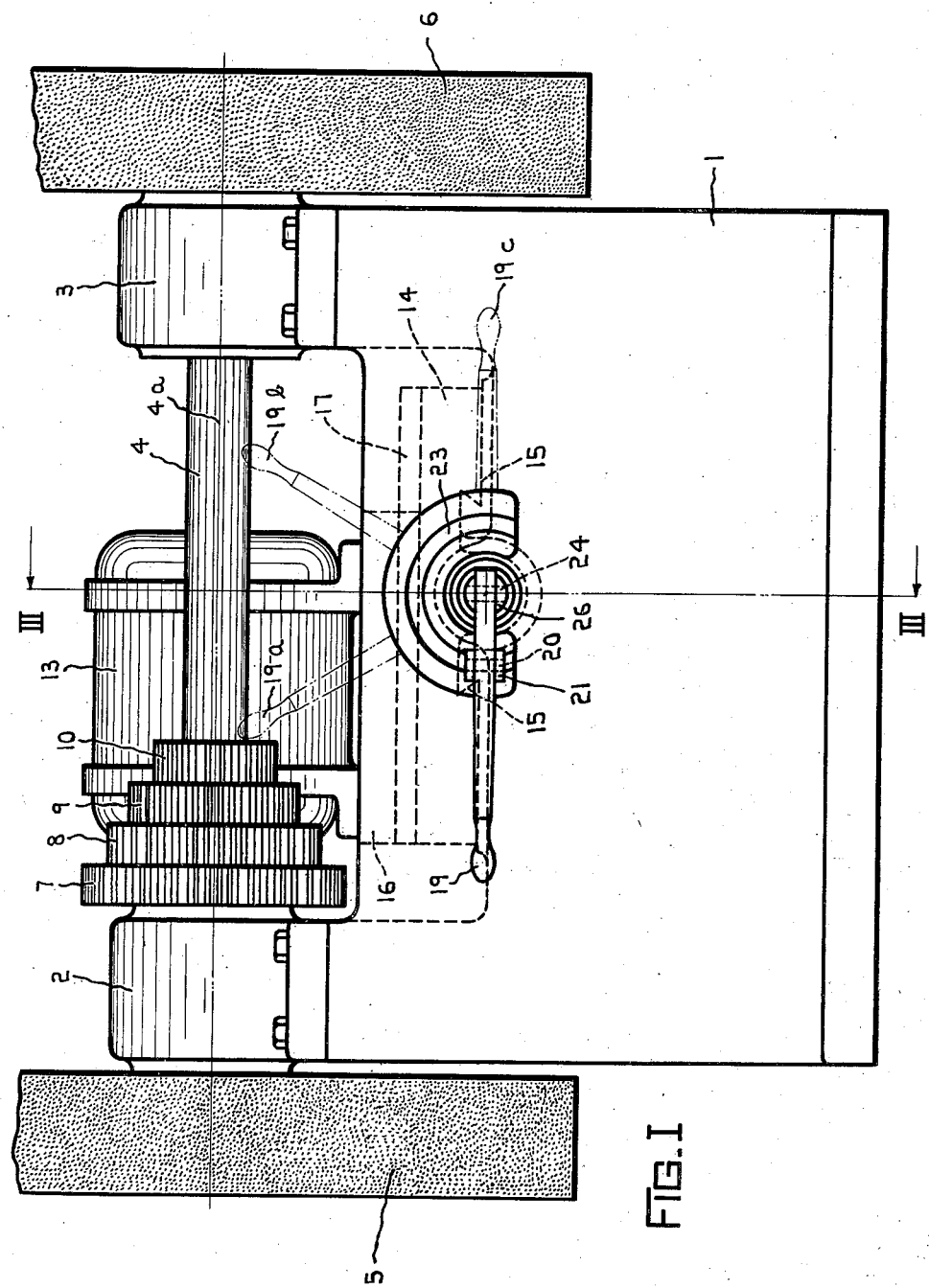

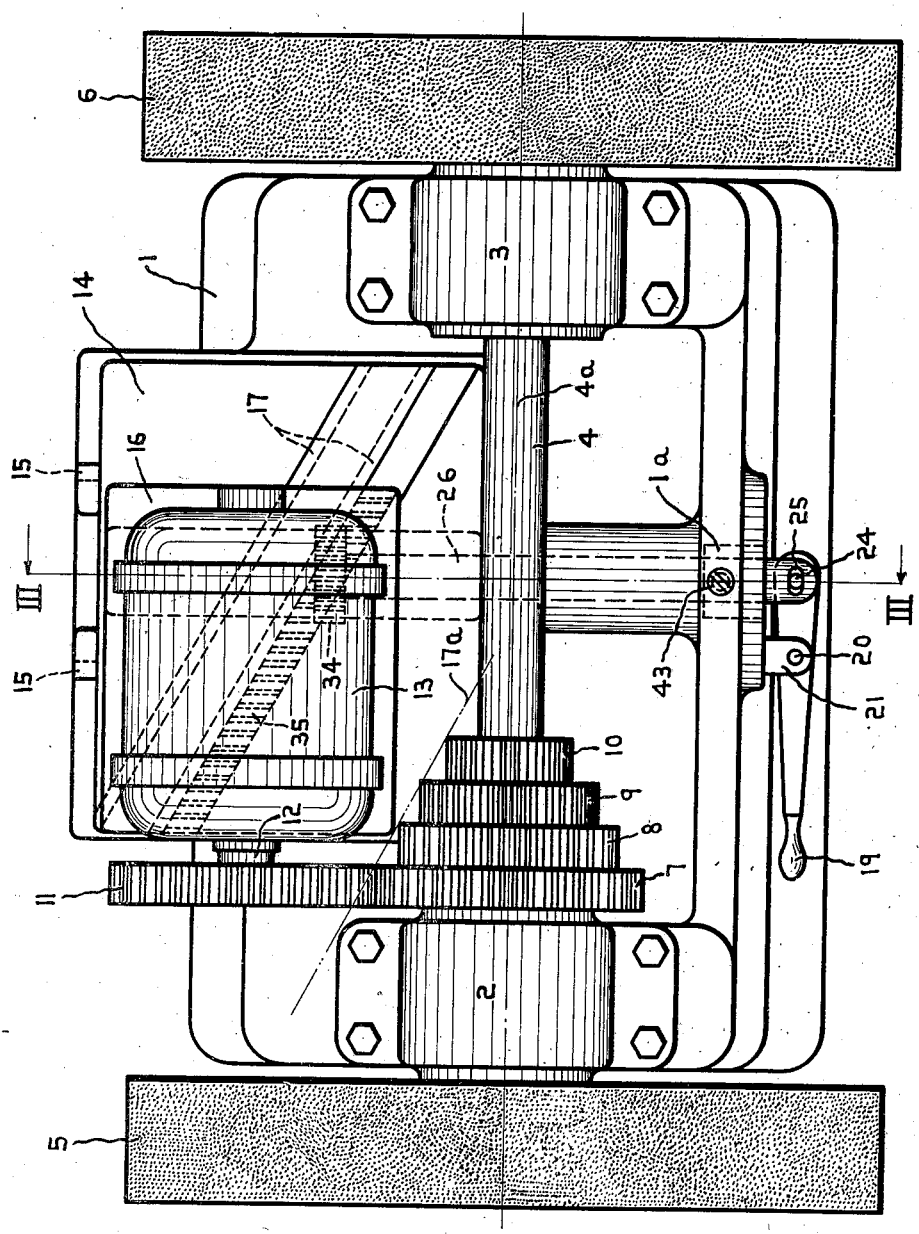

2,277,432

UNITED STATES PATENT OFFICE 2,277,432

SPEED CHANGING MECHANISM

Willard L. Groene, Cincinnati, Ohio, assignor to The Cincinnati Electrical Tool Company, Cincinnati, Ohio, a corporation of Ohio Application December 23, 1940, Serial No. 371,346

4 Claims. (Cl. 51—166)

This invention pertains to speed changing mechanism and is particularly related to apparatus for shifting a prime mover or driving motor having geared transmission mechanism to a member to be driven by means of a single lever control arrangement which may be operated rapidly and with the highest degree of efficiency and with a minimum of effort and skill on the part of the operator.

Heretofore, in apparatus attempting to accomplish the result of applicant's case, it has invariably been found necessary to use at least two different levers to effect the speed change from one rate of operation to the next and that the apparatus was highly complicated and involved in so far as the operating mechanism is concerned.

One of the chief objects of this invention is to provide a simplified and efficient single handle shifting mechanism for a motor having a gear which drives in a cone of gears of the member to be driven so that the motor may be shifted rapidly and readily from one to the next of the various gears of the cone of gears by motion of a single control lever.

A further object of this invention is to provide a detent arrangement which operates automatically so that as the lever, after it is moved out from one position, will automatically jump into the next position by a single swinging motion of the control lever without requiring any careful guiding or assistance on the part of the operator in attempting to position the driving motor relative to the cone of gears to be driven by it.

A further object of this invention is to provide means for moving such a gear drive motor and cone transmission mechanism in an angularly related direction to the axes of rotation of the shaft motor and member to be driven parallel to the conical surface defined by the cone of gears.

A further object of this invention is to provide in such an angular moving device for the driving motor, a rack having helical teeth which are arranged on the rack perpendicular to the axes of rotation of the motor and the shaft to be driven while the rack itself is positioned parallel to the direction of angular sliding movement of the motor along the cone of gears and then to provide a straight spur gear operating in said rack which may be rotated so as to effect the displacement of the motor along this angular direction of travel.

It is also an object of this invention to provide a single lever control which is capable of moving a motor having a gear driving in a cone of gears of the member to be driven which may be moved to radially disengage the gear of the motor from any of said cone of gears and by swinging said lever to provide means for moving said motor angularly with respect to the axis of rotation of said cone of gears but substantially parallel to the conical plane defined by the cone of gears, whereby to position said motor with respect to each of said cone of gears and then to provide means for again moving the gear on said driving motor radially into driving engagement with said cone of gears.

It is also an object to provide in conjunction with this last mentioned arrangement, a stop which accurately limits the radial in mesh position of the gear of the motor and the cone of gears and to provide resilient means for maintaining the driving engagement of the motor drive gear and the cone of gears at all times.

Further features and advantages of this invention will appear from the detailed description of the drawing in which:

Figure I is a front elevation of a pedestal type snagging grinding machine to which this invention is shown applied particularly indicating the various positions of the single lever control handle for shifting the motor which drives the cone of gears on the grinding wheel spindle of the grinder.

Figure II is a plan view of the machine shown in Figure I, particularly showing the angularly disposed helical rack and slide arrangement carrying the main driving motor with its driving gear in engagement with the cone of gears mounted on the grinding wheel spindle.

Figure III is a transverse section through the machine on the line III—III of Figures I, II, and IV, particularly showing the detent mechanism and the resilient means and stops for properly positioning the driving motor and its driving gear with respect to the cone of gears mounted on the grinding wheel spindle.

Figure IV is a fragmentary section on the line IV—IV of Figures II and III particularly showing the detent spool and detent arrangement for positioning the control lever for the various speed changes to be made.

For illustrative purposes, this invention is shown applied to a pedestal type snagging grinding machine comprising a base 1 upon which is mounted the journal bearings 2 and 3 in which is carried the grinding wheel spindle 4 upon the outer ends of which are mounted the usual grinding wheels 5 and 6. On this grinding wheel spindle 4 are fixed the gears 7, 8, 9, and 10 constituting a cone of driving gears on the grinding wheel shaft 4.

These gears 7, 8, 9, and 10 are arranged to be respectively engaged by a driving gear 11 mounted on the shaft 12 of the main driving motors 13 by appropriately shifting the motor to effect this engagement by the unique apparatus of this invention.

This main drive motor 13 is mounted on a shifting mechanism to effect engagement of its driving gear 11 with the various cone of gears 7, 8, 9 and 10 comprising a sliding base member 14 mounted by suitable dove tail guideways 15 on the base 1 of the machine. On top of this member 14 is provided the angularly slidable motor base plate 16 which is arranged to slide, in an angularly related direction with respect to the axis of rotation 4a of the grinding wheel spindle, on suitable dove tail guideways 17 formed on the base member 14. On top of the angularly slidable plate 16 is mounted the driving motor 13 by suitable screws 18.

The base plate 14 may be moved on the guideways 15 and the motor plate 16 moved on the guideways 17 in proper relation to each other by the single control lever 19 which is pivotally mounted by a suitable pin 20 carried in the bifurcated end portion of the sliding pivot member 21 having a T-shaped head 22 operating in the semi-circular T slot 23 formed in the base 1 of the machine. The lower end of this lever 19 has fixed in it a pin 24 which operates in the elongated slot 25 formed in the bifurcated end portion of the rock shaft 26 which is journaled in a suitable bearing 27 in the base 1 of the machine and also is supported by the detent sleeve 28 which is suitably fixed to it by a pin 29 and which sleeve in turn is journaled in the bore 30 also formed in the base 1 of the machine. Thus, by this arrangement, swinging the lever so as to carry the member 21 around in the T slot 30, will cause rocking movement of the shaft 26, whereas pushing the lever in and out will cause axial shifting of the shaft 26.

The rear portion of said rock shaft 26 projecting outwardly from the bearing 27 is supported in a bearing 31 in the movable base plate 14 and also supported at its rear reduced end in a suitable bearing portion 32 in this member 14. Between these bearings 31 and 32 is nicely fitted a driving pinion 33 which is securely pinned to the shaft 26 by the pin 34 so that there can be no axial movement of the shaft 26 with respect to the member 14 whereby axial movement of the shaft 26, effected by pulling the lever 19 in and out, will cause the member 14 to be moved back and forth on the dove tail 15 of the base of the machine.

The pinion 33 is arranged to engage a helical rack 35 which is fixed on the angularly movable plate 16, so that as the lever 19 is swung around, moving the member 21 in the T slot 23, the pinion 33 will likewise be rotated in engagement with the rack 35 to effect the angular displacement of the motor along the dove tail 17 in a direction substantially parallel to the line 17a defined by the cone of gears 7, 8, 9, and 10, the rack 35 being prepared with helical teeth of the same angular relationship to the straight side of the rack as the angular relationship of the dove tail 17 with respect to the axis 4a of the grinding wheel spindle 4 so that a rotary motion of the gear 34 parallel to this axis 4a may be readily transferred to the angular motion of the plate 16 on the dove tail guideways 17 of the plate 14 to thereby effect the movement of the motor 13 in such a way as to take care of the various different diameters of the gears 7, 8, 9, and 10 on the grinding wheel shaft 4.

The member 14 is normally held, so as to move the gear 11 on the motor 13 into proper pitch line driving relationship with the respective gears 7, 8, 9, and 10 of the cone of gears, by means of a spring 36 carried in the bore 30 in the base 1 and which bears against the bottom 30a of this bore 30 and also against the face 28a of the detent sleeve 28 so as to normally push the shaft 26 to the left, as shown in Figure III. The base plate 14 has provided on it an abutment surface 37 which engages the abutment surface 38 of the base 1 so as to accurately and positively limit the inward position of the base plate 14 to give the proper running engagement of the gear 11 with any of the cone of gears 7, 8, 9, and 10, the spring normally holding these surfaces 37 and 38 in firm contact during the driving action of the motor on the cone of gears.

In order to provide means for automatically positioning the plate 16 along the angular dove tail 17 for proper engagement of the gear 11 with the respective gears 7, 8, 9, and 10, the detent sleeve, as best seen in Figure IV, is provided with a series of detent notches 39, 40, 41, and 42 respectively corresponding with the engagement of the gear 11 with the respective gears 7, 8, 9, and 10 and in the portion 1a of the base 1 is provided a detent pin 43 which projects into the bore 30a and is arranged to engage in the various detent notches 39, 40, 41, and 42.

The operation of this arrangement is as follows: Assuming the gear 11 to be in mesh with the gear 7 and it is desired to shift the gear 11 to engagement with the gear 8, the lever 19 is drawn forwardly so as to move the shaft 26 rearwardly or to the right, as shown in Figure III, which causes disengagement of the gear 11 from the gear 7 by movement of the member 14 on the dove tail 15. In so doing, the detent plunger 14 is thus brought relative outwardly beyond the outer surface 44 of the detent sleeve 28 so that the lever 19 may now be rotated or moved around the annular T slot 23 to a position 19a rotating the shaft 26 and therefore the pinion 33 which in turn causes the rack 35 to move the motor plate 16 to the right as shown in Figure II bringing the motor and the gear 11 into position relative to the gear 8 at which time the next notch 49 in the sleeve 28 is then positioned in alignment with the detent plunger 43, whereupon the spring 36 can then automatically thrust the shaft 26 and therefore the member 14 to the left, Figure III, so as to then reengage the gear 11 with the gear 8 of the cone of gears on the spindle shaft 4, the abutment surface 37 of the base plate 14 engaging the surface 38 of the base 1 to set the driving engagement between the gears 11 and 8. Similarly, the movement of the lever to the other positions 19b and 19c as shown particularly in Figure I, effects the simple and rapid engagement of the motor driving gear 11 with the cone of gears 9 and 10.

Having thus fully set forth and described my invention what I claim as new and desire to secure by United States Letters Patent is:

1. In a grinding machine, a base, a grinding wheel spindle journaled on said base, grinding wheels on said spindle, a cone of gears fixed on said spindle, a base plate mounted on said frame for straight line movement perpendicular to the axis of rotation of said grinding wheel spindle, a motor plate mounted on said base plate having straight line movement angularly related to the axis of rotation to said grinding wheel spindle, a driving motor mounted on said angularly movable motor plate, a driving gear mounted on the shaft of said driving motor, and means for effecting movement of said base plate and said motor plate for selectively presenting the driving gear into engagement with each of the gears of said cone of gears, said mechanism comprising a single control lever pivotally mounted on the front of said machine for both swinging and in and out motion relative to the front of the base of said machine, and means for utilizing said swinging motion of said lever for moving said motor plate and said in and out motion of said lever for moving said base plate.

2. In a grinding machine, a base, a grinding wheel spindle journaled on said base, grinding wheels on said spindle, a cone of gears fixed on said spindle, a base plate mounted on said frame for straight line movement perpendicular to the axis of rotation of said grinding wheel spindle, a motor plate mounted on said base plate having straight line movement angularly related to the axis of rotation to said grinding wheel spindle, a driving motor mounted on said angularly movable motor plate, a driving gear mounted on the shaft of said driving motor, and means for effecting movement of said base plate and said motor plate for presenting the driving gear of said motor into engagement with each of the gears of said cone of gears, said mechanism comprising a rock shaft journaled against axial movement in said base plate, a pinion fixed on said rock shaft, arranged to engage a helical rack on said motor plate, and a single lever control means for axially moving said rock shaft and for rotating said rock shaft whereby said movements of said lever respectively effect movement of said base plate and said motor plate for presenting the driving gear of said motor to said cone of gears on said grinding wheel spindle.

3. In a grinding machine, a base, a grinding wheel spindle journaled on said base, grinding wheels on said spindle, a cone of gears fixed on said spindle, a base plate mounted on said frame for movement perpendicular to the axis of rotation of said grinding wheel spindle, a motor plate mounted on said base plate having movement angularly related to the axis of rotation to said grinding wheel spindle, a driving motor mounted on said angularly movable motor plate, a driving gear mounted on the shaft of said driving motor, and means for effecting movement of said base plate and said motor plate for presenting the driving gear of said motor into engagement with each of the gears of said cone of gears, said mechanism comprising a rock shaft journaled against axial movement in said base plate, a pinion fixed on said rock shaft arranged to engage a helical rack on said motor plate, and a single lever control means for axially moving said rock shaft and for rotating said rock shaft, whereby said movements of said lever respectively effect movement of said base plate and said motor plate for selectively presenting the driving gear of said motor to said cone of gears on said grinding wheel spindle, and means for automatically effecting movement of said base plate in one direction to effect automatic engagement of the gear of said driving motor with the gears of said cone of gears.

4. In a grinding machine, a base, a grinding wheel spindle journaled on said base, grinding wheels on said spindle, a cone of gears fixed on said spindle, a base plate mounted on said frame for movement perpendicular to the axis of rotation of said grinding wheel spindle, a motor plate mounted on said base plate having movement angularly related to the axis of rotation of said grinding wheel spindle, a driving motor mounted on said angularly movable motor plate, a driving gear mounted on the shaft of said driving motor, and means for effecting movement of said base plate and said motor plate for presenting the driving gear of said motor into engagement with each of the gears of said cone of gears, said mechanism comprising a rock shaft journaled against axial movement in said base plate, a pinion fixed on said rock shaft arranged to engage a helical rack on said motor plate, a single lever control means for axially moving said rock shaft and for rotating said rock shaft, whereby said movements of said lever respectively effect movement of said base plate and said motor plate for selectively presenting the driving gear of said motor to said cone of gears on said grinding wheel spindle, means for automatically effecting movement of said base plate in one direction to effect automatic engagement of the gear of said driving motor with said cone of gears, and means for predetermining the relative position of said lever in effecting the movement of said motor plate for rendering the movements of said base plate automatically effective at predetermined times when said driving gear on said driving motor is in proper alignment with one of the gears of said cone of gears.

WILLARD L. GROENE.